United States Patent [19]
Cargille

[11] Patent Number: 6,046,556
[45] Date of Patent: Apr. 4, 2000

[54] MOTOR CURRENT SENSING CIRCUIT

[75] Inventor: Donald R. Cargille, Culver City, Calif.

[73] Assignee: Hughes Electronics Corporation, El Segundo, Calif.

[21] Appl. No.: 09/174,643

[22] Filed: Oct. 19, 1998

[51] Int. Cl.[7] ..................................................... H02P 3/08
[52] U.S. Cl. .......................... 318/254; 318/439; 318/801; 318/803; 318/811
[58] Field of Search ............................ 318/254, 801–804, 318/811, 819, 831; 388/804, 811, 819, 831

[56] References Cited

U.S. PATENT DOCUMENTS 3,848,165   11/1974   Hiberger ............................ 318/207 R
5,086,492   2/1992   Kent ..................................... 388/815
5,874,818   2/1999   Schuurman ........................... 318/439

*Primary Examiner*—Robert E. Nappi
*Assistant Examiner*—Rita Leykin
*Attorney, Agent, or Firm*—Terje Gudmestad; M. W. Sales

[57] ABSTRACT

A motor current sensing circuit using a single sensing resistor in the motor current path to sense the current from the voltage source. The circuit includes an amplifier and a unity-gain inverter that translate the current across the sensing resistor into a voltage analog of the current in the motor. At any instant in time, the magnitude of the voltage across the sensing resistor is proportional to the magnitude of the motor current. During the forward portion of the duty cycle, a high-speed switch connects the sensor output to the amplified sensed bus current analog. During the reverse portion, the sensor output is connected to the inverted bus current analog. The average value of the sensor output is the voltage analog of the average value of the motor current.

11 Claims, 2 Drawing Sheets

MOTOR CURRENT SENSING CIRCUIT

TECHNICAL FIELD

The present invention relates to motor current sensing for use with a motor torque control servo loop, and more particularly, to a motor current sensor for reaction wheels and momentum wheels in satellite applications.

BACKGROUND ART

It is desirable to sense motor current flowing in momentum wheel and reaction wheel control electronics for motor control purposes. However, some prior art sensing methods require exotic hardware such as Hall Effect devices. Other prior art sensing methods have high power consumption and often produce unwanted heat, reducing efficiency.

One prior art current sensor uses ferrite cores with Hall Effect devices inserted in the magnetic path. A core is placed around each lead of a three-phase motor. The current in the magnetic field produces a proportional flux in the core that produces a voltage in the Hall Effect device proportional to the flux and the motor current. There are several drawbacks with this prior art sensor. For example, Hall Effect devices often have poor repeatability and can be unstable. Also, during orbit, satellites are subjected to ionizing radiation. While basic Hall Effect devices, such as thresholded, digital flux detectors, have proven radiation performance, the linear current sensor Hall Effect devices required for this sensitive space application have not been developed.

Another prior art sensor is shown in FIG. 1. The circuit has two sensing resistors 1 and 2. The circuit also requires that diodes, 3 through 8 in FIG. 1, be included in the motor current path at all times. The voltage drop in a diode can range from 0.6 volts to 1.0 volts, and can be the largest voltage drop of any component in the motor driver. The result of this voltage drop is a significant reduction in efficiency of the motor driver. Not only does this method waste bus power on a satellite, but it also produces heat, which introduces an additional problem of dissipating the waste heat.

A simple, power-efficient motor current sensor that does not require Hall Effect current sensors and power wasting, heat producing, diodes is needed to improve the efficiency of motor current sensing on board spacecraft.

SUMMARY OF THE INVENTION

The present invention is a simpler, more power-efficient motor current sensing circuit for use with a motor torque control servo loop. The current sensing circuit of the present invention uses a single current sensing resistor, analog electronics, and a digital switching signal from the logic circuit portion of the servo's digital control system. The sensing resistor senses the voltage analog of the current from a voltage source, and the circuit of the present invention translates the sensed current into an output voltage analog of the current flowing in the motor. Motor current is sensed, and thereby controlled, for application to momentum wheel and reaction wheel control electronics. Unlike prior art sensors, the sensor of the present invention requires neither Hall Effect sensors nor diodes.

It is an object of the present invention to improve the efficiency of motor current sensors.

It is another object of the present invention reduce the need to dissipate waste heat from a motor current sensing circuit.

It is yet another object of the present invention to eliminate the need for exotic Hall Effect devices that are unreliable and unstable.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
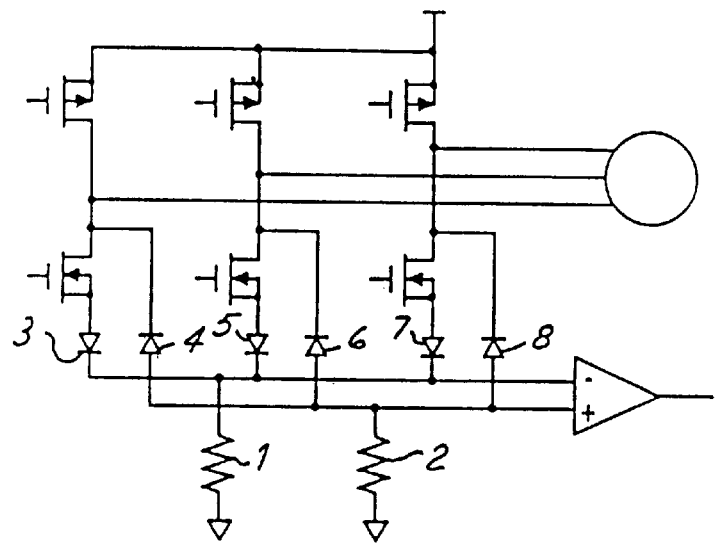
FIG. 1 is a schematic of a prior art motor current sensing circuit.
Figure 2:
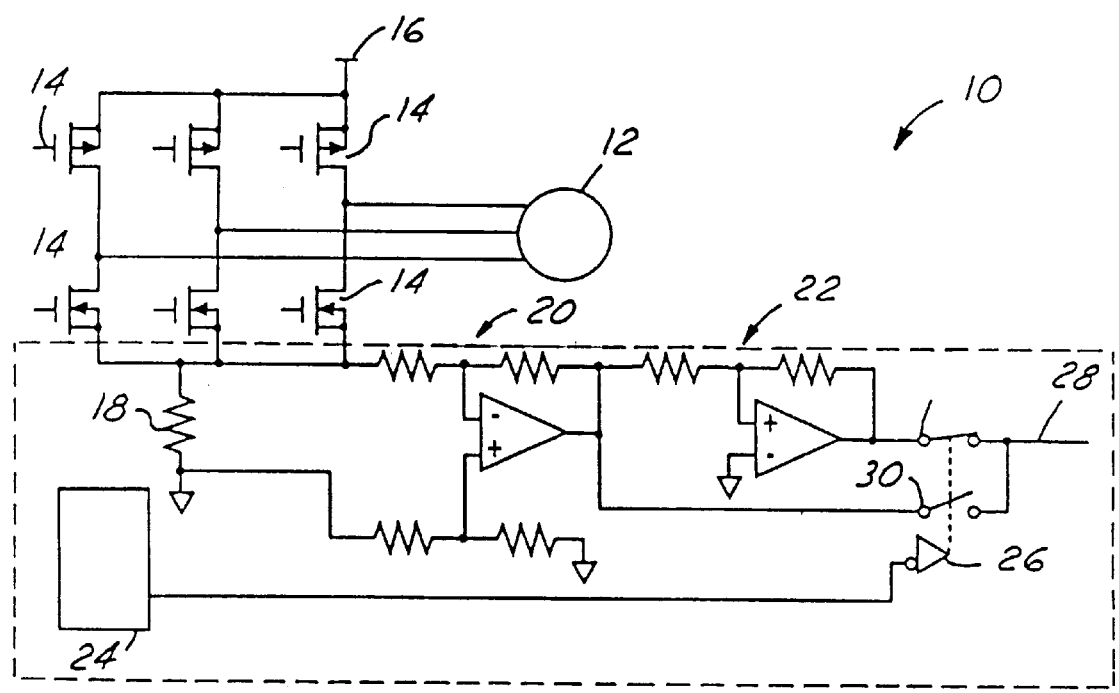
FIG. 2 is a schematic of a motor current sensing circuit in accordance with the present invention.
Figure 3:
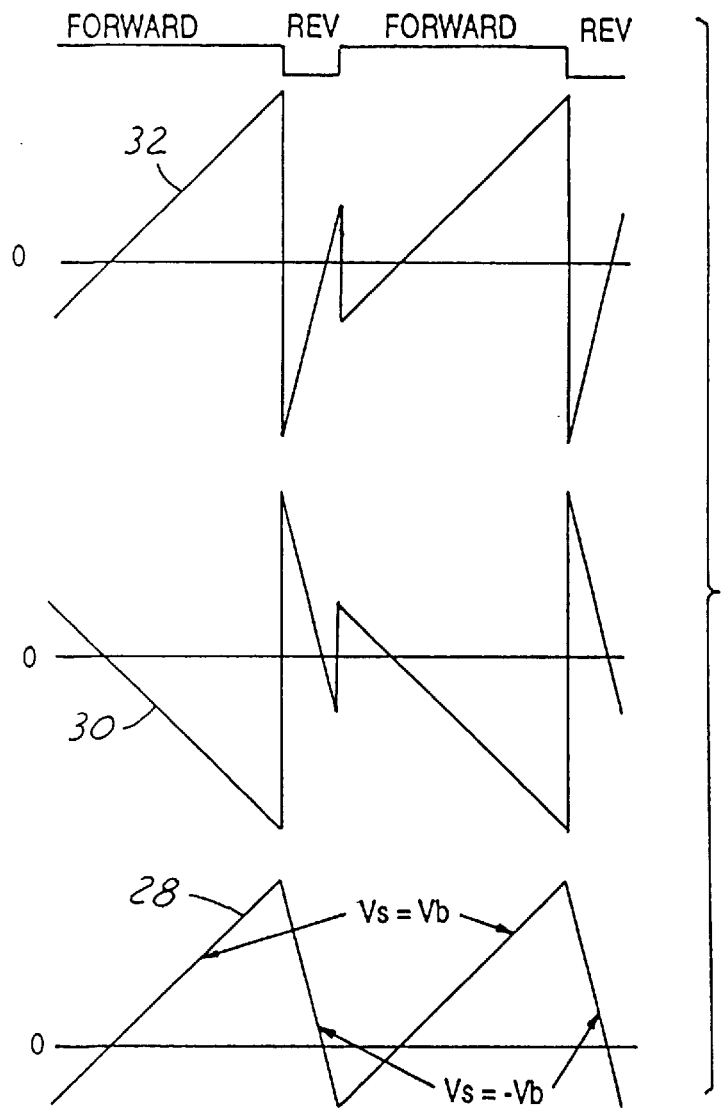
FIG. 3 shows two cycles of the pulse width modulated duty cycle of the power switches in the motor current sensing circuit of the present invention.

Referring to FIGS. 2 and 3, and in particular to FIG. 2, there is shown a motor current sensing circuit 10 in accordance with the present invention. The circuit 10 is used to sense motor current in order to control motor current for devices such as momentum wheels and reaction wheels. The circuit 10 of the present invention is shown and described in conjunction with a three-phase motor 12. However, the invention may be extended to additional phases as would be obvious to persons of ordinary skill in the art.

FIG. 2 shows a three-phase motor 12 having two power switches 14 at each lead. In the preferred embodiment the power switches 14 are transistors. A voltage source 16 supplies power to the motor 12. A single sensing resistor 18 is located in the motor current path. The current sensing circuit 10 of the present invention does not require diodes so there is no wasted power and no waste heat to be dissipated.

The circuit 10 includes an amplifier 20 and a high-speed, analog, unity-gain inverter 22 connected to the sensing resistor 18. The first two resistors at the inputs of the amplifier 20 are equal in value to each other but are smaller in value than the remainder of the resistors in the circuit. The remaining resistors in the circuit are also equal in value to each other. For example, typical values would be 100 for the two resistors at the amplifier input and 10k for the remainder of the resistors in the circuit. A digital logic controller 24 controls a high-speed analog switch 26 that toggles between the amplifier 20 output and the inverter 22 output. The same digital logic controller 24 that controls the power switches 14 may be used to control the high-speed analog switch 26.

In operation, the sensing resistor 18 senses the current from the voltage source. Therefore, the average value of the voltage across the sensing resistor 18 is proportional to the current supplied to the power switches 14 and not the actual motor current. Nevertheless, at any instant in time, the magnitude of the voltage across the sensing resistor 18 is proportional to the magnitude of the motor current. The circuit 10 of the present invention translates the voltage across the sensing resistor 18 into an output voltage 28 analogous to the current in the motor.

A pulse width modulated duty cycle controlled by the digital logic controller 24 has a forward portion and a reverse portion. During the forward portion of the pulse width modulated duty cycle, the high-speed analog switch 26 connects the sensor output 28 to the amplifier 20 and provides the sensed bus current's voltage analog 30 or $V_b$. During the reverse portion of the duty cycle, the output 28 is connected to the inverter 22 and provides the inverse of the sensed bus current's voltage analog 32, or $-V_b$, as produced by the high-speed, analog, unity-gain inverter 22. High-speed op-amps must be used. The average value of the output voltage 28 is the voltage analog of the average motor current.

FIG. 3 shows the pertinent waveforms for two cycles of the pulse width modulated duty cycle.

Figure 4:
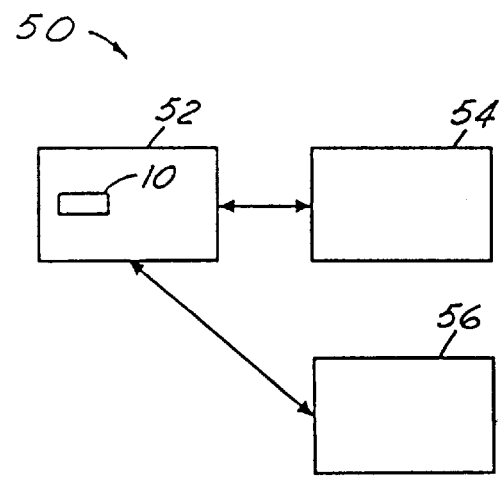
FIG. 4 is a system diagram of a satellite application utilizing the circuit of the present invention.

FIG. 4 is a block diagram of a three-axis stable satellite system 50 in which the current sensor 10 of the present application can be used. The current sensor 10 is part of a wheel drive electronics system 52 that is in communication with both spacecraft attitude control electronics 54 and either a momentum wheel or reaction wheel 56. The current sensor 10 senses the motor current and communicates with the attitude control electronics 54. The attitude control electronics 54 then communicates back to the wheel drive electronics system 52 which controls the momentum or reaction wheel 56 based on the commands from the attitude control electronics 54.

By eliminating the need for heat producing diodes, the current sensor 10 of the present invention is much more efficient than prior art sensors that use diodes. The current sensor of the present invention uses only one sensing resistor 18, and does not require diodes so there is no voltage drop in the diodes and no need to dissipate diode heat.

While particular embodiments of the invention have been shown and described, numerous variations and alternate embodiments will occur to those skilled in the art. Accordingly, it is intended that the invention be limited only in terms of the appended claims.

What is claimed is:

1. A motor current sensing circuit for a motor, said motor current sensing circuit comprising:
   a sensing resistor in said motor current path for sensing a bus current;
   an amplifier circuit located across said sensing resistor and providing an output voltage analogous to said motor current;
   an inverting circuit connected to the output of amplifier circuit and providing an inverted output voltage analogous to an inverse of said motor current;
   a high-speed analog switch for toggling between said output voltage and said inverted output voltage; and
   a digital signal processor for providing a pulse width modulated duty cycle for controlling said high-speed analog switch;
   whereby, said sensed bus current is translated into an output voltage analogous to said motor current.

2. The motor current sensing circuit as claimed in claim 1 wherein said inverting circuit further comprises an analog signal inverter having an operational amplifier configured with a gain of minus one.

3. The motor current sensing circuit as claimed in claim 1 wherein said amplifier and said inverting circuit further comprise operational amplifiers.

4. The motor current sensing circuit as claimed in claim 1 wherein said digital signal processor is further used for driving said motor.

5. A motor current sensing circuit for a motor having a plurality of power switches at each phase lead, said motor current sensing circuit comprising:
   a sensing resistor in said motor current path for sensing a bus current;
   an operational amplifier circuit located across said sensing resistor and providing an output voltage analogous to said motor current;
   an analog signal inverter having an operational amplifier configured for a gain of minus one, said analog signal inverter located across said sensing resistor and providing an inverted output voltage analogous to said motor current;
   a high-speed analog switch for toggling between said output voltage and said inverted output voltage; and
   a digital signal processor for providing a pulse width modulated duty cycle for controlling said high-speed analog switch, said pulse width modulated duty cycle also controlling said plurality of power switches;
   whereby said sensed bus current is translated into an output voltage analogous to said motor current.

6. A three-axis satellite system comprising:
   a) a three phase motor;
   b) a least one reaction wheel controlled by said three-phase motor; and
   c) a motor current sensing circuit, said circuit comprising:
   i) a sensing resistor in said motor current path for sensing a bus current;
   ii) an amplifier circuit located across said sensing resistor and providing an output voltage analogous to said motor current;
   iii) an inverting circuit connected to the output of said amplifier circuit and providing an inverted output voltage analogous to an inverse of said motor current;
   iv) a high-speed analog switch for toggling between said output voltage and said inverted output voltage; and
   v) a digital signal processor for providing a pulse width modulated duty cycle for controlling said high-speed analog switch;
   d) whereby, said sensed bus current in said circuit is translated into an output voltage analogous to said motor current.

7. The motor current sensing circuit as claimed in claim 6 wherein said inverting circuit further comprises an analog signal inverter having an operational amplifier configured for a gain of minus one.

8. The motor current sensing circuit as claimed in claim 6 wherein said amplifier circuit and said inverting circuit further comprise operational amplifiers.

9. A three-axis satellite system comprising:

a three phase motor;

a least one momentum wheel controlled by said three-phase motor;

an electronic, 3-phase, motor driver; and a motor current sensing circuit, said sensing circuit comprising:

a sensing resistor in said motor current path for sensing a bus current;

an amplifier circuit located across said sensing resistor and providing an output voltage analogous to said motor current;

an inverting circuit connected to the output of said amplifier circuit and providing an inverted output voltage analogous to an inverse of said motor current;

a high-speed analog switch for toggling between said output voltage and said inverted output voltage; and a digital signal processor for providing a pulse width modulated duty cycle for controlling said high-speed analog switch;

whereby, said sensed bus current is translated into an output voltage analogous to said motor current.

10. The motor current sensing circuit as claimed in claim 9 wherein said inverting circuit further comprises an analog signal inverter having an operational amplifier configured for a gain of minus one.

11. The motor current sensing circuit as claimed in claim 9 wherein said amplifier circuit and said inverting circuit further make use of operational amplifiers.

* * * * *